United States Patent
Nagata et al.

[11] Patent Number: 5,771,652
[45] Date of Patent: Jun. 30, 1998

[54] WINDOW MOLDING FOR AUTOMOBILES

[75] Inventors: Takuji Nagata; Masao Kobayashi, both of Aichi-ken; Shinichi Goto, Gifu-ken; Hiroshi Iwasaki, Aichi-ken, all of Japan

[73] Assignee: Toyoda Gosei Co., Ltd., Nishikasugai-gun

[21] Appl. No.: 683,318

[22] Filed: Jul. 18, 1996

[30] Foreign Application Priority Data

Jul. 18, 1995 [JP] Japan ................................. 7-181472
May 17, 1996 [JP] Japan ................................. 8-122916

[51] Int. Cl.⁶ ............................. B60J 1/02; B60J 10/02
[52] U.S. Cl. ........................... 52/716.5; 52/204.597; 52/208; 52/716.2; 52/716.8; 52/717.01; 52/717.05; 296/93
[58] Field of Search ............................ 52/716.5, 716.6, 52/716.8, 717.01, 717.05, 208, 204.597, 716.2; 296/93

[56] References Cited

U.S. PATENT DOCUMENTS

| | | | |
|---|---|---|---|
| 5,190,338 | 3/1993 | Yada | 296/93 |
| 5,248,179 | 9/1993 | Biermacher et al. | 296/93 X |
| 5,348,364 | 9/1994 | Yada | 296/93 |
| 5,389,423 | 2/1995 | Yada | 296/93 X |
| 5,395,563 | 3/1995 | Goto et al. | . |
| 5,441,688 | 8/1995 | Goto et al. | . |
| 5,456,049 | 10/1995 | Goto et al. | . |

FOREIGN PATENT DOCUMENTS

| | | |
|---|---|---|
| 5-213060 | 8/1993 | Japan . |
| 5-215514 | 8/1993 | Japan . |
| 7-52228 | 2/1995 | Japan . |

*Primary Examiner*—Christopher Kent
*Attorney, Agent, or Firm*—Cushman Darby & Cushman IP Group of Pillsbury Madison & Sutro LLP

[57] ABSTRACT

A window molding for automobiles, which is installed around the periphery of a windshield, including a leg and a head. The head is formed to permit the creation of two different water guide portions extending along the molding, one that will function along the roof line and another along the side edge of the windshield. The side water guide portion prevents water from going from the windshield to the side windows. The roof line water guide portion opens toward the window frame and prevents water from flowing from the roof onto the windshield.

6 Claims, 5 Drawing Sheets

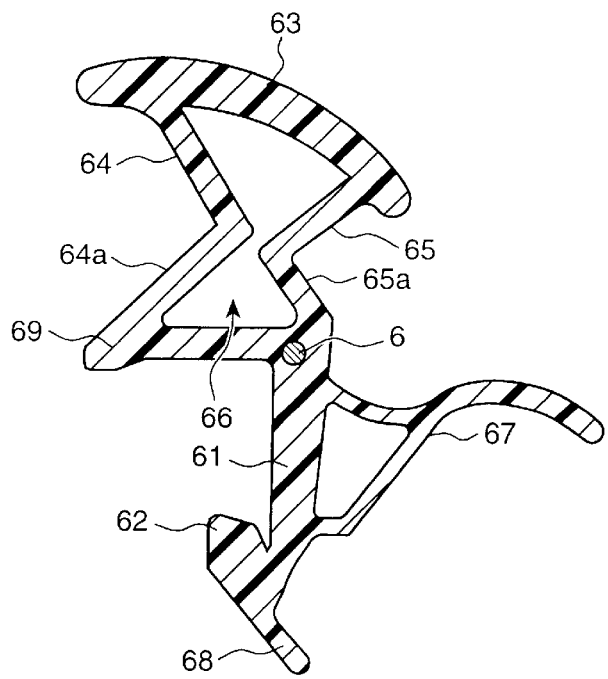
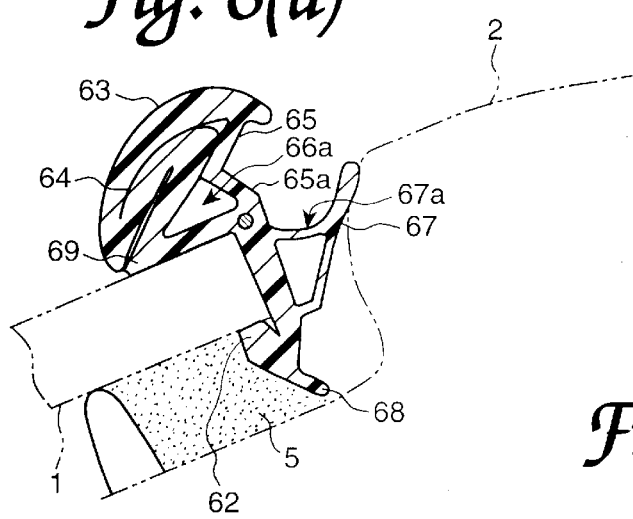
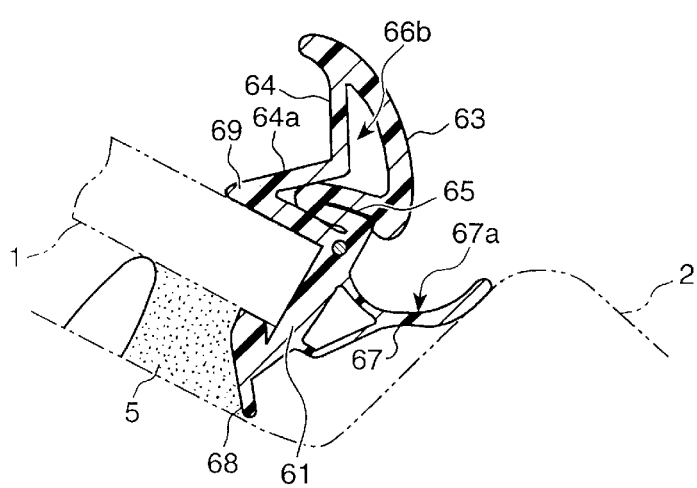

WINDOW MOLDING FOR AUTOMOBILES

BACKGROUND OF THE INVENTION

1. Field of the invention

This invention relates to window moldings, and more particularly to automobile window moldings which fit into a gap between the windshield and a window frame.

2. Description of Related Art

As shown in FIG. 9(b), the elongate window molding includes side members 10, which extend into the gap between right and left edges of the windshield 1 and the window fame 2, and a roof line member 20, shown in FIG. 9(a), closes (extends across) the gap between the upper edge of the windshield 1 and the window frame 2.

The side member 10 comprises a leg 11 inserted into the gap between the edge of the windshield 1 and the window frame 2, as shown in FIG. 9(b). The leg 11 includes a support portion 12, which touches and supports a peripheral back side of the windshield 1, a holding portion 13, which elastically contacts the inside surface of the window frame 2, and a contact portion 14, positioned opposite support portion 12, that contacts the front surface of windshield 1. Leg 11 is fixed in place with the adhesive 5. Member 10 also includes a head 15 spaced outwardly from the contact portion 14. A seal lip 16 is formed at the window frame 2 side of the head 15. A folding portion 17 provides a connecting web between the window end of head 15 and the corresponding end of the contact portion 14 and forms a rain gutter. A tubular portion 18 is collectively defined by the upper part of leg 11, head 15, folding portion 17 and contact portion 14.

After being extruded with the same shape as the side member 10 shown in FIG. 9(b), the roof line member 20 can be pressed on the upper side with a press roller, forcing the outer part of head 15 down onto portion 14. As shown in FIG. 9(a), the roof line member 20 comprises a deformed head 21 and a deformed folding portion 22. A deformed tubular portion 23 is collectively defined by the upper part of the leg 11, the deformed head 21, the deformed folding portion 22 and the contact portion 14. The deformed tubular portion 23 is smaller than the tubular portion 18. The other structures of the roof line member 20 are the same as the structures of the side member 10.

A core member 6 is embedded within the leg 11. The core member 6 reinforces the window moldings and prevents expansion and contraction of the window moldings. A dam 7 is provided to keep the adhesive 5 beneath the window.

Conventionally, window molding for automobiles, as constructed above, is formed from a synthetic resin material, such as a polyvinyl, that is extruded by an extruder into the sectional shape shown in FIG. 9(b). The head 15 of the extruded body, corresponding to the roof line member 20, is pressed inwardly or downwardly in the height direction by a press roller. This causes the folding portion 17 to be folded inwardly at its center so that the deformed folding portion 22 and the deformed head 21 are piled on the contact portion 14. Then, the extruded body is cooled, hardened and cut in a fixed length to complete the window molding.

When the window molding is assembled around the perimeter of the front window glass of automobiles, the undeformed head of the side members projects out from the front window glass and functions as a rain gutter. Thus, an outer surface of the unpressed folding portion prevents rainwater, swept by a wiper, from overflowing toward the window frame and guides and drains the rainwater downward along the lateral edges of the front glass window. The deformed head of the roof line member has a flattened profile and projects out from the window surface less than the undeformed portion, thereby not obstructing aerodynamic characteristics.

The conventional window molding prevents rainwater from flowing toward the side door glass and maintains a driver's ability to see out of the side windows when it is raining with the side members having a guide drain formed of the folding portion that projects out from the front window glass. The roof line member of the conventional window molding has good aerodynamic characteristics.

When raining, however, rainwater may flow from the roof back on to the windshield of automobiles. If rain is prevented from flowing from the roof back on to the windshield, vision from the automobile through the windshield is improved.

SUMMARY OF THE INVENTION

One object of the present invention is to provide a window molding for automobiles that prevents rainwater from overflowing from the windshield to the side windows and also from the roof onto the windshield. Another object of the present invention is to provide a window molding for automobiles that maintains desirable aerodynamic characteristics.

In accordance with one embodiment of the invention, there is provided a window molding for automobiles that has an elongated leg inserted into a gap between the perimeter of a windshield and a window frame. A head is formed at one lateral end of the leg and covers the perimeter of the windshield. At the right and left side edges of the windshield, the head has a first guiding member opening toward the windshield side as a rain gutter. The first guiding member prevents rainwater from overflowing from the windshield toward the side windows. At the roof side of the windshield, the head has a second guiding member opening toward the window frame side that will also act as a rain gutter. The second guiding member prevents rainwater from flowing from the roof to the windshield.

Preferably, the overall height of the head portion gradually decreases beginning in the area adjacent the upper front window glass corner toward the upper side, or roof line, with the end of the head substantially touching the windshield. The height of the window frame side of the head portion gradually decreases from the upper windshield corner toward the right and left sides. The end of the head is closed at the window frame or the leg of the window molding. Therefore, the unnecessary portion of the first and second guiding member required for forming a rain gutter closes the head toward the windshield and the window frame, respectively. When driving, loss of aerodynamic characteristics is, therefore, prevented.

Other objects, features, and characteristics of the present invention will become apparent upon consideration of the following description in the appended claims with reference to the accompanying drawings, all of which form a part of the specification, and wherein like reference numerals designate corresponding parts in the various figures.

BRIEF DESCRIPTION OF THE DRAWINGS

FIG. 5 is a cross sectional view of a third embodiment of a window molding for automobiles;

FIG. 6(a) is a cross sectional view of an roof line of the third embodiment, taken at a point corresponding to line A—A of FIG. 8;

FIG. 6(b) is a cross sectional view of a side member of the third embodiment, taken at a point corresponding to line B—B of FIG. 8;

DETAILED DESCRIPTION OF THE PREFERRED EMBODIMENTS

Figure 1:
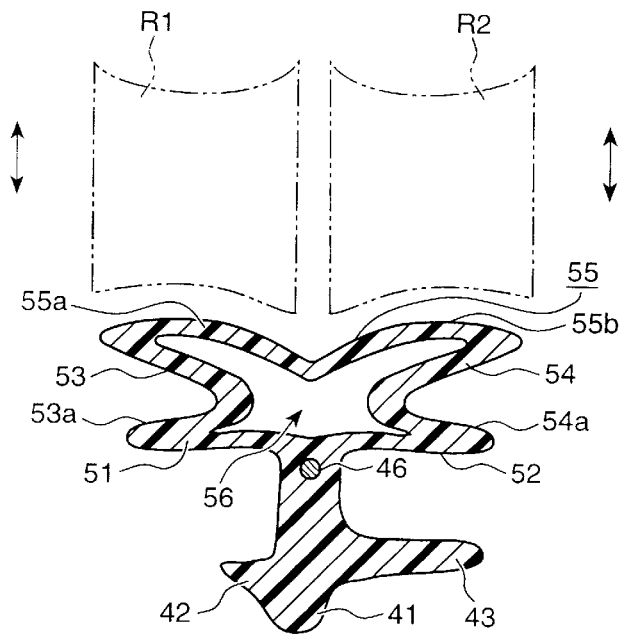
FIG. 1 is a cross sectional view of a first embodiment of a window molding for automobiles.

A first embodiment of a window molding for automobiles is shown in FIGS. 1 and 2. The window molding of the first embodiment comprises a leg 41, a support portion 42 and a holding portion 43. The leg 41, the support portion 42 and the holding portion 43 are substantially the same structures as used in the conventional window molding. The window molding also includes a contact portion 51 and a seal lip 52 at an upper part of the leg 41 that extend outwardly in a right-angle direction from each side of leg 41. The contact portion 51 is spaced apart from the support portion 42 and a perimeter of the edge of the windshield is held therebetween. The seal lip 52 touches an outside surface of the window frame 2 and produces a seal at the point of contact.

A head 55 is connected at the upper end of leg 41 via the contact portion 51, the seal lip 52. Head 55 also includes a first folding portion 53 and a second folding portion 54. The head 55 is formed with a substantially plate-like shape to extend over and thereby cover each perimeter of the windshield 1 and the window frame 2. The head 55 comprises a first covering portion 55a covering a perimeter of the front window glass 1 and a second covering portion 55b covering a perimeter of the window frame 2. The first covering portion 55a connects to the end of the contact portion 51 via the first folding portion 53. The first folding portion 53 is folded inwardly similar to the conventional window molding. The second covering portion 55b connects to the end of the seal lip 52 via the second folding portion 54. The second folding portion 54 is folded inwardly with a symmetrical shape similar to the first folding portion 53. The head 55 is bedded downwardly a little between the first and second covering portion 55a and 55b and the cross sectional shape of the head 55 is a substantially "V"-letter shape.

At side portions of the right and left side windshield 1, a first water guide portion 53a, for controlling water flow at each side of the front windshield, is formed at the first folding portion 53 located between the contacting portion 51 and the first covering portion 55a. A second water guide portion 54a, for use to prevent water flow from the roof onto the window, is formed at the second folding portion 54 located between the seal lip 52 and the second covering portion 55b.

Figure 2A:
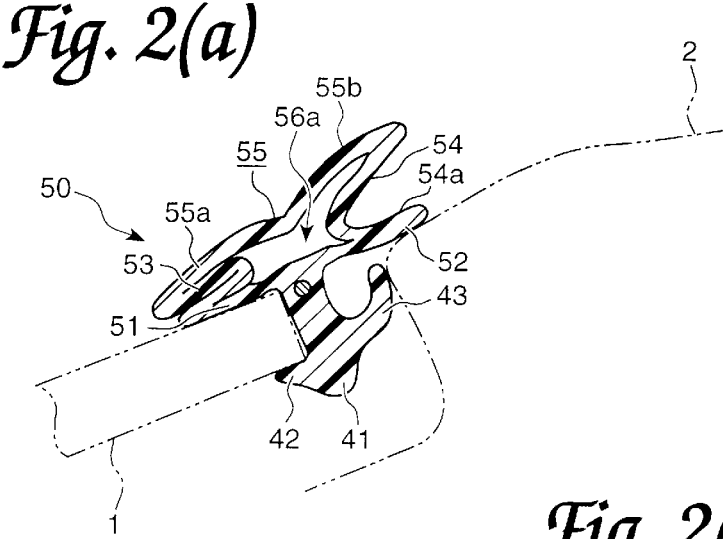
FIG. 2(a) is a cross sectional view of a roof line of the first embodiment, taken along lines A—A of FIG. 8.
Figure 3:
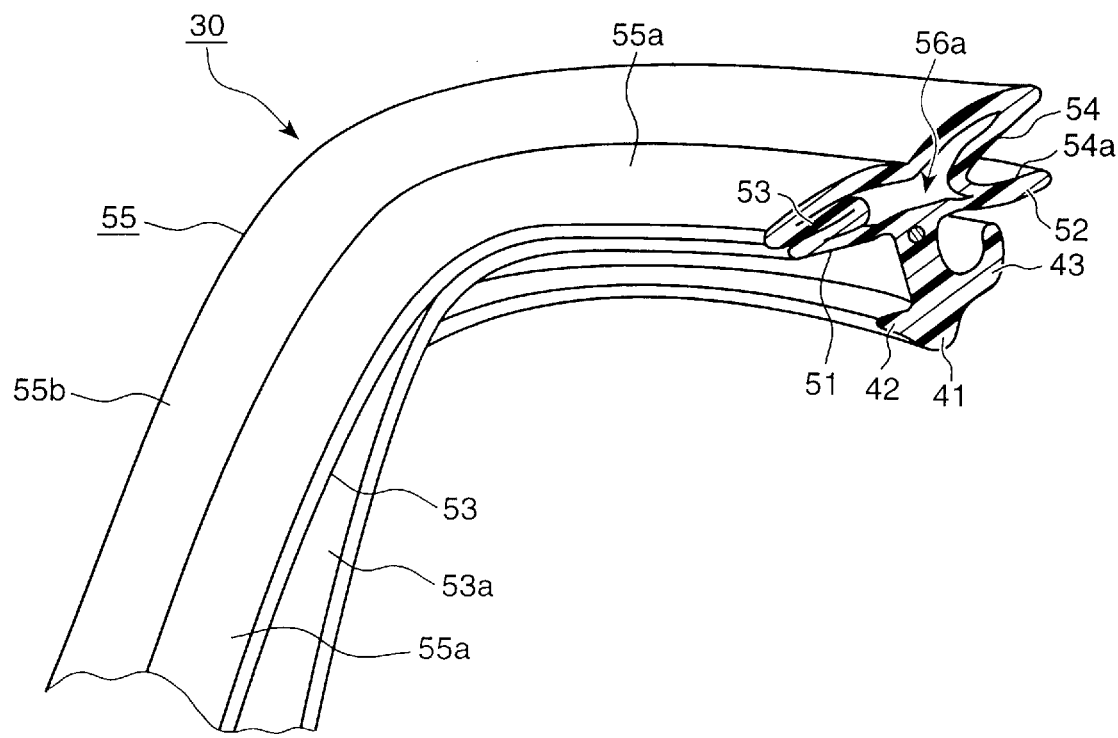
FIG. 3 is schematic view of a corner portion of the first embodiment of the window molding.

The molding used along the sides of the front windshield and along automobile roof line 50 are shown in detail in FIGS. 2(a) and 3. The degree to which the first folding portion 53 is open gradually changes to become closed at the corner portion of the windshield 1 and the first folding portion 53 is closed along the roof line side of the windshield 1. Thus, the first covering portion 55a of the head 55 gradually approaches the contacting portion 51 toward the upper corner portions of the windshield 1 and is attached to the contacting portion 51 along the roof line portion of the windshield 1.

On the other hand, the second folding portion 54 forms a second water guide portion 54a that extends along the upper portion of the windshield 1 adjacent the front edge of the roof. Therefore, the deformed tubular portion 56a is defined among the head 55, the contacting portion 51, the seal lip 52 and the first and second folding portion 53 and 54. The deformed tubular portion 56a has a smaller size than the tubular portion 56 in FIG. 1 and has a different shape than the tubular portion 56.

Figure 2B:
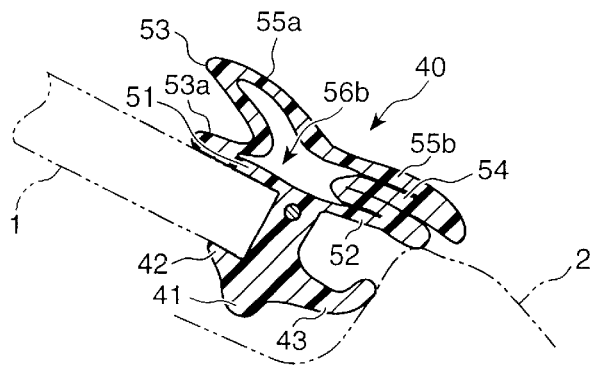
FIG. 2(b) is a cross sectional view of a side member of the first embodiment, taken along lines B—B of FIG. 8.
Figure 8:
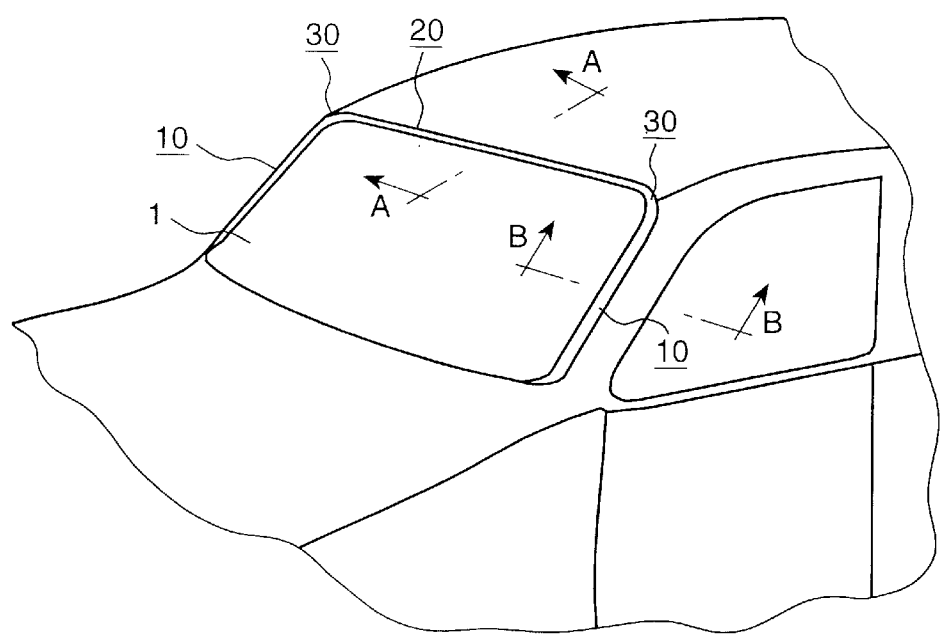
FIG. 8 is a schematic view of a window molding for automobiles installed in the gap between a windshield and a window frame.
Figure 9A:
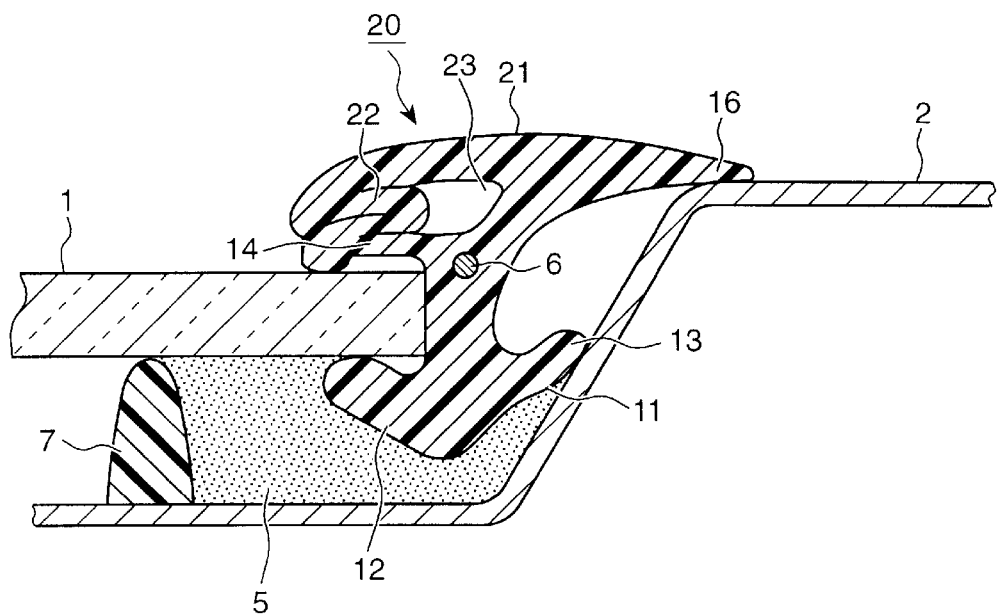
FIG. 9(a) is a cross sectional view of an roof line of the conventional window molding, taken along lines A—A of FIG. 8.
Figure 9B:
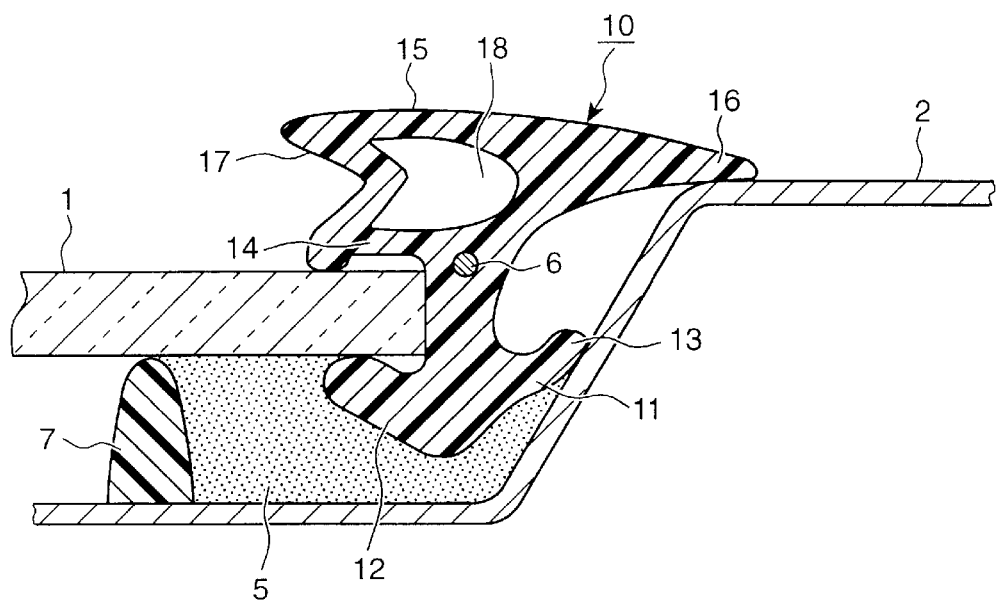
FIG. 9(b) is a cross sectional view of a side member of the conventional window molding, taken along lines B—B of FIG. 8.

As shown in FIG. 2(b) of the side member 40, the second folding portion 54 at the upper corners 30, shown in FIG. 8, changes to become closed adjacent those upper corner portions of the windshield 1 and the second folding portion remains closed along the side of the front windshield 1. This is accomplished by having the second covering portion 55b of the head 55 gradually approach the seal lip 52 and at the corner member 30 attaches to the seal lip. On the other hand, the first folding portion 53 forms the first water guide portion 53a along the side member 40. Therefore, the deformed tubular portion 56b is defined by the head 55, the contacting portion 51, the seal lip 52 and the first and second folding portion 53 and 54. The deformed tubular portion 56b again has a smaller size than the tubular portion 56 in FIG. 1 and has a different shape than does tubular portion 56.

After extruding the basic shape of the molding in FIG. 1, the first covering portion 55a, which is still soft since it has not yet been allowed to cool has its shape changed to that shown in FIG. 2(a) due to pushing by a pushing roller R1, shown in a dot-dash line in FIG. 1. The second covering portion 55b, which is also still soft due to retained heat, changed to the shape shown in FIG. 2(b) due to pushing by a pushing roller R2 shown in a dot-dash line in FIG. 1. Then this deformed molding is cut to a given length. Similar apparatus for manufacturing this type window molding is shown in Japanese laid-open patents No. hei 5-215514, hei 5-213060, hei 5-106972 and hei 7-52228.

This window molding is installed at the gap between the window frame 2 and the windshield 1. The leg 41 is inserted into the gap between the frame 2 and the windshield and is adhered to the window frame 2 by adhesive. The head 55 covers the gap. At the side member 40, the first covering portion 55a is raised from the surface of the windshield 1 and the second covering portion 55b lies close to the surface of the window frame 2. Therefore, the first water guide portion 53a of the side molding 40 is formed by the first folding portion 53. The first water guide portion 53a prevents water from overflowing from the windshield 1 on to the side windows and guides water flowing to it downwardly. The desirable aerodynamic characteristic of vehicle is maintained, because the height of the second covering portion 55b from the surface of the window frame 2 is at a minimum.

At the roof line member 50, the first covering portion 55a accesses the surface of the windshield 1. The second covering portion 55b is apart from the window frame 2. Therefore, the second folding portion 54 forms a second water guide portion 54a. The second water guide portion 54a prevents water from overflowing from the roof back on to the windshield 1 and guides to transverse direction. Desirable aerodynamic qualities of vehicle are still maintained, because the height that the first covering portion 55a extends from the surface of the front window glass 1 is minimized.

Figure 4:
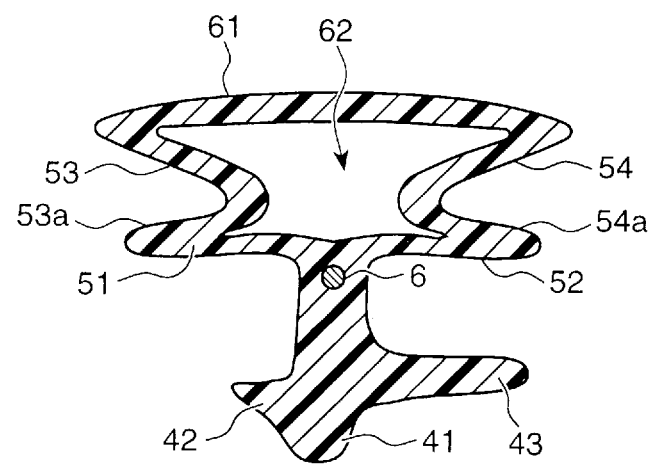
FIG. 4 is a cross sectional view of a second embodiment of a window molding for automobiles.

A second embodiment of a window molding for automobiles is shown in FIGS. 4. The head 61 of the second embodiment in FIG. 4 is formed with a plate-like shape when compared with the indented shape of head 55 of the first embodiment in FIG. 1.

A third embodiment of a window molding for automobiles is shown in FIGS. 5 and 6 and has an asymmetric shape.

The window molding of the third embodiment comprises a smooth head 63, a leg 61, a seal lip 67, a contact portion 69 and a support portion 62. The contact portion 69 extends from the upper end of leg 61 to left side. The left end of the head 63 connects to left end of the contact portion 69 via a first folding portions 64 and 64a, and also connects to the upper end of the leg 61 via second folding portions 65 and 65a. The first V-shaped folding portion 64 is longer than the second V-shaped folding portion 65. Therefore, before deforming the cross-sectional shape is cross shaped and the head 63 inclines towards the window frame. The first v-shaped folding portion 64 form a first water guide portion 64a that extends along the left side, while the second V-shaped folding portion 65 forms a second water guide portion that extends along the right side.

The seal lip 67 is formed at the right side of the leg 61 and has a tubular portion to reinforce the base. As shown in FIG. 6(a) and 6(b), the seal lip 67 touches the inside surface of window frame 2. The seal lip 67 seals between the leg 61 and the window frame 2 and also the upper surface of the seal lip 67 forms a third water guide portion 67a. Therefore, though the second water guide portion 65a formed by folding portion 65 is comparatively small, a relatively large combined water guide is formed at a window frame side due to the cooperation between the second folding portion 65 forming the second water guide portion 65a and the third water guide portion 67a.

The support portion 62 is formed at the lower end of leg 61. The front windshield is held between the support portion 62 and the connecting portion 69 as in FIGS. 6(a) and 6(b).

This window molding further comprises a small lip 68 formed at a lower end of leg 61; lip 68 prevents adhesive 5 from moving toward the window frame.

This window molding of the third embodiment is molded and shaped in a manner that is similar to that described previously for the first embodiment. After extruding the basic shape as in FIG. 5, the head 63, which is still soft retained heat can be deformed by press rollers into the shape shown in FIG. 6(a) for use along the roof line. The head 63 could, alternatively, be still soft by after-heat, changed into the shape set forth in FIG. 6(b) for use along the side of the windshield. Then this deformed molding cut to a given length.

At the roof line 20 in FIG. 8, as shown in FIG. 6(a), the first folding portions 64 and 64a are folded and the left end of the head 63 is attached at the left end of connecting portion 51. The second folding portion 65 forms the second water guide 65a.

Along the side member 10 in FIG. 8, as shown in 6(b), the second folding portion 65 is folded with the window frame side end of head 63 is attached at the upper end of the leg 61. The first folding portion 64 forms the first water guide 64c.

At the corner portions 30 in FIG. 8, the first water guide 64a and the second water guide 65a change from the shape and configuration shown in FIG. 6(a) to that of 6(b). At this time, the deformed positions of the first and second folding portion 64, 65 have a different height, but the first and second folding portions 64 and 65 do not interfere with each other.

Therefore, the window molding of the third embodiment has an effect similar to the first embodiment. Thus, this window molding prevents water from overflowing from the front windshield to side windows. Desirable aerodynamic qualities of the vehicle are maintained. The window molding of this third embodiment further has a effect that the third water guide 67a guides water downwardly at the sides member 10 so that the third water guide 67a still exists along the sides.

Figure 7:
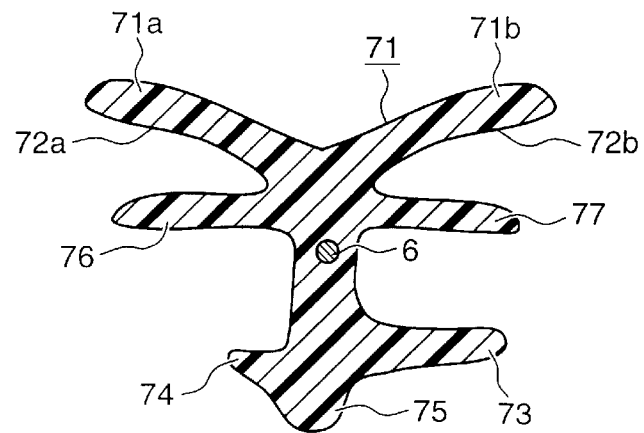
FIG. 7 is a cross sectional view of a fourth embodiment of a window molding for automobiles.

A fourth embodiment of a window molding for automobiles is shown in FIGS. 7.

The window molding of the fourth embodiment comprises a leg 75, a head 71, a contact portion 76, a seal lip 77, a support portion 74 and a holding portion 73. The head 71 comprises a first portion 71a and a second portion 71b and a center of the head 71 is connected at the upper end of the leg 75. The contact portion 76 extends from the upper end of the leg 75 to the windshield side of that leg. The seal lip 77 extends from the upper end of the leg 75 toward the window frame side. Support portion 74 is formed at the lower end of the leg 75 and extends toward the windshield side. The holding portion 73 is also formed at the lower end of leg 75 and extends to the right hand or frame side. This window molding of the fourth embodiment does not have a tubular portion at the head so that this embodiment does not have folding portions such as the first embodiment and the third embodiment.

Window molding according to the fourth embodiment is molded in a similar manner to the first embodiment. After extruding the basic shape shown in FIG. 7, the first portion 71a of the head 71, while still hot and soft can be changed to the shape desired at the roof line 20 where 72c will be attached to 76. The second portion 71b of the head 71, also while still hot and soft could also be changed to the shape form at the side 10 by having 72b attached to 77. Then this deformed molding is then cut a given length.

Therefore, the window molding of the fourth embodiment has the effect similar to the first embodiment preventing water from overflowing from the front windshield to side windows. Desirable aerodynamic qualities of the vehicle are also still maintained. The window molding of this fourth embodiment further has an effect that a die for molding a tubular portion is not necessary at a die head.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A window molding for an automobile adapted to be inserted between and interconnect an automobile body with first and second side edges and an upper edge of a windshield of the automobile, said window molding comprising:

at least one vertical member; and a horizontal member integrally connected with said vertical member, wherein said vertical and horizontal members each includes an elongated leg member and a head integrally formed on an upper edge of said elongated leg member, said head having first and second water guide members, said first water guide member defined by a first side surface of said head facing the windshield when said window molding is inserted between the automobile body and the windshield, said second water guide member defined by a second side surface of said head facing away from the windshield when said window molding is inserted between the automobile body and the windshield, wherein at least a portion of said first water guide member of said vertical member has a maximum height for detering water on the windshield from overflowing on to side windows of the automobile, and said second water guide member of said vertical member has a minimum height for enhancing the aerodynamic characteristic of the automobile, and wherein said first water guide member of said horizontal member has a minimum height for enhancing the aerodynamic characteristic of the automobile, and at least a portion of said second water guide member of said horizontal member has a maximum height for detering water from flowing from a roof of the automobile onto the windshield.

2. A window molding as in claim 1, wherein said vertical and horizontal members each further comprises:

an outer support member integrally formed at an upper end of said leg member and under said head and extending towards the windshield when said window molding is inserted between the automobile body and the windshield; and an inner support member integrally formed at a second position on the same side of said leg member as said outer support member, said inner support member being spaced from said outer support member.

3. A window molding as in claim 1, wherein the height of said first water guide member of said vertical member gradually decreases along a direction towards a corner of said window molding defined by an intersection of said vertical member and said horizontal member.

4. A window molding as in claim 1, wherein said vertical and horizontal members each further comprises a lip extending outwardly from a side of said leg facing away from the windshield when said window molding is inserted between the automobile body and the windshield.

5. A window molding as in claim 4, wherein an upper surface of said lip forms a third water guide member.

6. A window molding as in claim 5, wherein said third water guide member is formed continuously along said horizontal and vertical members.

* * * * *